(12) United States Patent
Wildmoser et al.

(10) Patent No.: US 6,606,319 B1
(45) Date of Patent: Aug. 12, 2003

(54) METHOD AND CIRCUITRY FOR TRANSMITTING DIGITAL DATA USING AN ENHANCED ISDN TECHNIQUE

(75) Inventors: Johann Wildmoser, Pfaffenhofen (DE); Karl-Heinz Möhrmann, München (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/367,405
(22) PCT Filed: Feb. 3, 1998
(86) PCT No.: PCT/EP98/00572
§ 371 (c)(1), (2), (4) Date: Aug. 12, 1999
(87) PCT Pub. No.: WO98/36611
PCT Pub. Date: Aug. 20, 1998

(30) Foreign Application Priority Data

Feb. 17, 1997 (DE) .......................... 197 06 080

(51) Int. Cl.⁷ .............................................. H04L 12/28
(52) U.S. Cl. .................... 370/394; 370/470; 370/471
(58) Field of Search .................... 370/470, 471, 370/477, 522, 524, 468, 84, 80, 394

(56) References Cited

U.S. PATENT DOCUMENTS 4,899,337 A * 2/1990 Hirai ........................... 370/80
5,278,827 A * 1/1994 Pound ......................... 370/84
5,519,702 A * 5/1996 Takahashi .................... 370/84
5,598,413 A * 1/1997 Sansom ...................... 370/468

FOREIGN PATENT DOCUMENTS

| DE | 34 42 883 A1 | 5/1986 |
| DE | 35 36 874 A1 | 4/1987 |
| DE | 35 46 132 C2 | 11/1989 |
| DE | 41 17 869 A1 | 12/1992 |
| DE | 42 28 583 A1 | 11/1993 |
| DE | 195 17 966 A1 | 11/1996 |
| DE | 196 21 750 A1 | 12/1997 |

OTHER PUBLICATIONS

Gingell, J. "Building Blocks for ISDN", Electronics and Wireless World, vol. 95, No. 1646, Dec. 1989, pp. 1172–1174.

* cited by examiner

Primary Examiner—Dang Ton
Assistant Examiner—Robert W. Wilson
(74) Attorney, Agent, or Firm—McCormick, Paulding & Huber LLP (57) ABSTRACT

A method is described for transmitting digital data using the time-division multiplex method, in which the data are transmitted within a sequence of time frames (82, 84). In each time frame (82, 84), at least the number of transmitted data bits matches the option defined in the ISDN Standard for 2B1Q transmission. However, a plurality of time frames (82, 82), which form an overall frame (80), are transmitted within the time which is specified by the ISDN Standard for the transmission of an ISDN Standard time frame (60).

14 Claims, 7 Drawing Sheets

Basic clock GT = GT' = 38.4 MHz

| No. of time frames | B channels | Transmission rate kbps | Symbol frequency on the line (2B1Q) kHz | m1 | m2 | m3 |
|---|---|---|---|---|---|---|
| 1 | 2 | 160 | 80 | 240 | 1 | 480 |
| 2 | 4 | 320 | 160 | 120 | 2 | 240 |
| 3 | 6 | 480 | 240 | 80 | 3 | 160 |
| 4 | 8 | 640 | 320 | 60 | 4 | 120 |
| 5 | 10 | 800 | 400 | 48 | 5 | 96 |
| 6 | 12 | 960 | 480 | 40 | 6 | 80 |
| 8 | 16 | 1280 | 640 | 30 | 8 | 60 |
| 10 | 20 | 1600 | 800 | 24 | 10 | 48 |
| 12 | 24 | 1920 | 960 | 20 | 12 | 40 |
| 15 | 30 | 2400 | 1200 | 16 | 15 | 32 |
| 16 | 32 | 2560 | 1280 | 15 | 16 | 30 |

METHOD AND CIRCUITRY FOR TRANSMITTING DIGITAL DATA USING AN ENHANCED ISDN TECHNIQUE

The invention relates to a method for transmitting digital data using the time-division multiplex method, in which the data are transmitted within a sequence of time frames. In each time frame, at least the number of transmitted data bits matches the ISDN Standard.

DESCRIPTION OF THE PRIOR ART

ISDN Standard (Integrated Services Digital Network) is frequently used for transmitting data on two-wire lines, for examples for the telephone, fax and for data transmissions between computers. A disadvantage of the known ISDN Standard is that each line provides only two useful channels, each at 64 kbit/s (kilobits per second). However, the transmission of moving pictures, which may require data rates from several hundred kbit/s up to several Mbit/s, is impossible when transmitting data in accordance with the known ISDN Standard.

On the other hand, transmission standards for high data rates are known, for example the HDSL Standard (High bit rate Digital Subscriber Line), the VDSL Standard (Very high bit rate Digital Subscriber Line) as well as the ADSL Standard (Asymmetric Digital Subscriber Line). The data transmission rate of these Standards is at least fifteen times that of the ISDN Standard.

None of the existing standards solves the problem where it is desired to use: 1) existing terminals, 2) existing two-wire lines, and 3) the proven ISDN concept for higher data transmission, and where one wishes to increase the data transmission rate considerably above the current 128 kbit/s.

SUMMARY OF THE INVENTION

The object of the invention is to specify a simple method for transmitting data which is compatible with the ISDN Standard but which allows higher data rates than this Standard.

This object is achieved by a method having the steps of transmitting data bits within a sequence of time frames matching the ISDN Standard, transmitting overall frames comprised of a plurality of time frames within a time specified by the ISDN Standard for transmitting a time frame, and using a frame identifier (which is contained within at least one overall frame in a sequence of transmitted overall frames) to define an assignment of contained time frames to an overall frame. This object is also achieved by a circuit arrangement for implementing this method, and by other advantageous developments described below.

The invention is based on the knowledge that changes must be carried out in a number of areas in order to increase the data rate of the known ISDN Standard, which was developed for connection-oriented transmissions. However, in order to allow increased data rate transmissions using the ISDN Standard, the basic requirements of the ISDN Standard must not be changed, or they must at least be taken into account when defining an enhanced ISDN. This relates particularly to the number of data bits in a time frame and the time specified by the known ISDN Standard for transmitting the time frames. This time is defined, for example, in Technical Report ETR 080 by the European Telecommunications Standardization Institute for the ISDN Standard with the 2B1Q transmission option (2 Binary, 1 Quaternary) to be 1.5 milliseconds. The same definition is also included in the ITU Recommendation G.961 (International Telecommunication Union).

The invention thus retains the number of data bits per time frame. However, a plurality of time frames, which form an overall frame, are transmitted within the time which is specified by the known ISDN Standard for transmitting an ISDN Standard time frame (1.5 ms). This measure on its own increases the data transmission capacity, corresponding to the number of time frames in an overall frame. If the other features of a time frame which are specified by the known ISDN Standard are also retained, such as the assignment of time slots to useful channels and data channels, then the increased transmission capacity means that more ISDN channels are available on one data line. If, for example, there are two time frames in an overall frame, then four channels at 64 kbit/s each can be used for transmitting useful data.

According to the invention, at least one overall frame in the sequence of transmitted overall frames has a frame identifier. The frame identifier preferably occurs cyclically, for examples in each overall frame or in every tenth overall frame. The frame identifier is used to assign the time frames to their overall frames. The frame identifier makes it possible to determine precisely which time frames in each case belong to one overall frame, and which bits in a time frame are assigned to which channels.

The frame identifier allows a standard concept to be used for processing the overall frames. With one or two time frames per overall frame, differences between the time frames may be unnecessary. But problems in channel assignment arise as the number of time frames per overall frame increases. If the bits or time slots which are assigned to the individual channels in the time frames are arranged differently, which allows an increase in the flexibility of data transmission, then it must be possible to clearly distinguish the time frames from one another. This is precisely what is achieved by the frame identifier.

The requirement for the bits or time slots of a channel to be distributed as uniformly as possible within a time frame, and thus also to be interleaved within the overall frame, also means that the bits which are assigned to the individual channels in the time frames of an overall frame are arranged differently. This interleaving means that in the event of a disturbance or defect, even though a comparably greater number of channels are affected, the number of affected data items per channel is reduced. Error correction can therefore be carried out more easily.

In one exemplary embodiment of the invention, the number of time frames per overall frame is determined in a calibration process, as a function of the transmission quality of the transmission path. This measure allows the maximum permissible transmission capacity to be determined as a function of the quality as well as the length of an already existing line. The transmission then takes place with relatively few errors, since the data transmission capacity and the transmission path are optimally matched to one another. The calibration process is preferably repeated if a predetermined error rate for the transmission of data is exceeded during the transmission. This is the case, for example, if the transmission quality of the line changes over a period of years, possibly as a result of interference being radiated from newly connected lines.

In a further exemplary embodiment of the invention, at least one data item at a specified position in the overall frame and having a specified value, for example) of binary "0" is used as the frame identifier. This value differs from a value which is specified for this position in the other time frames of the respective overall frame. In this case, however, it is necessary to ensure that this bit can be evaluated correctly even in the event of transmission errors. The frame identifier must therefore be repeated cyclically at fixed time intervals. If, for example, the bit with the number "240" (which is not used in the known ISDN Standard) in every eighth time frame is used as the frame identifier, then this requirement is satisfied.

The frame identifier is expediently determined in combination with the determination of the frame identifiers, which are specified by the known ISDN Standard, in the time frames. Since, as a rule, the time frame identifiers have a number of bits, for example, eighteen, it is simple to determine this identifier. Starting from the time frame, the frame identifier of the overall frame which may be only a single data item, can be determined simply by counting down the data transmitted after the time frame identifier.

In exemplary embodiments of the invention, only data from a connection-oriented transmission can be transmitted. It is also possible to transmit only data from a non-connection-oriented for example for access to the Internet. Simultaneous connection-oriented and non-connection-oriented transmission is also envisaged. In the case of a transmission which is non-connection-oriented, the data are combined to form data packets, which contain data relating to the data packet (for example the address, length of the data packet, type of data packet) in a first part, and the useful data in a further part. When the overall frame is produced, these data packets are broken down and are transmitted in the time slots of a predetermined channel. The start of a packet is expediently signaled by a packet identifier in the overall frame. Bits which have not yet been used by the ISDN Standard may be used, for example, for signaling within the time frames.

The method according to the invention makes clock production for data transmission simple. Based on a predetermined basic clock, the clock signals are produced, corresponding to the number of time frames per overall frame, by setting division ratios in dividers in a divider chain. The division ratios are defined, for example, using the already mentioned calibration process.

A further aspect of the invention relates to a circuit arrangement for transmitting data, having the elements of a receiving unit, a frame producing unit, and an output unit, further utilizing a frame identifier contained within an overall frame in a sequence of transmitted overall frames. This circuit arrangement is used, in particular, for carrying out the method according to the invention and for carrying out an expedient embodiment of the invention. The technical effects mentioned above thus also apply to the circuit arrangement.

BRIEF DESCRIPTION OF THE DRAWINGS

Exemplary embodiments of the invention are explained in the following text with reference to the drawings, in which.

DESCRIPTION OF THE PREFERRED EMBODIMENT

Figure 1:
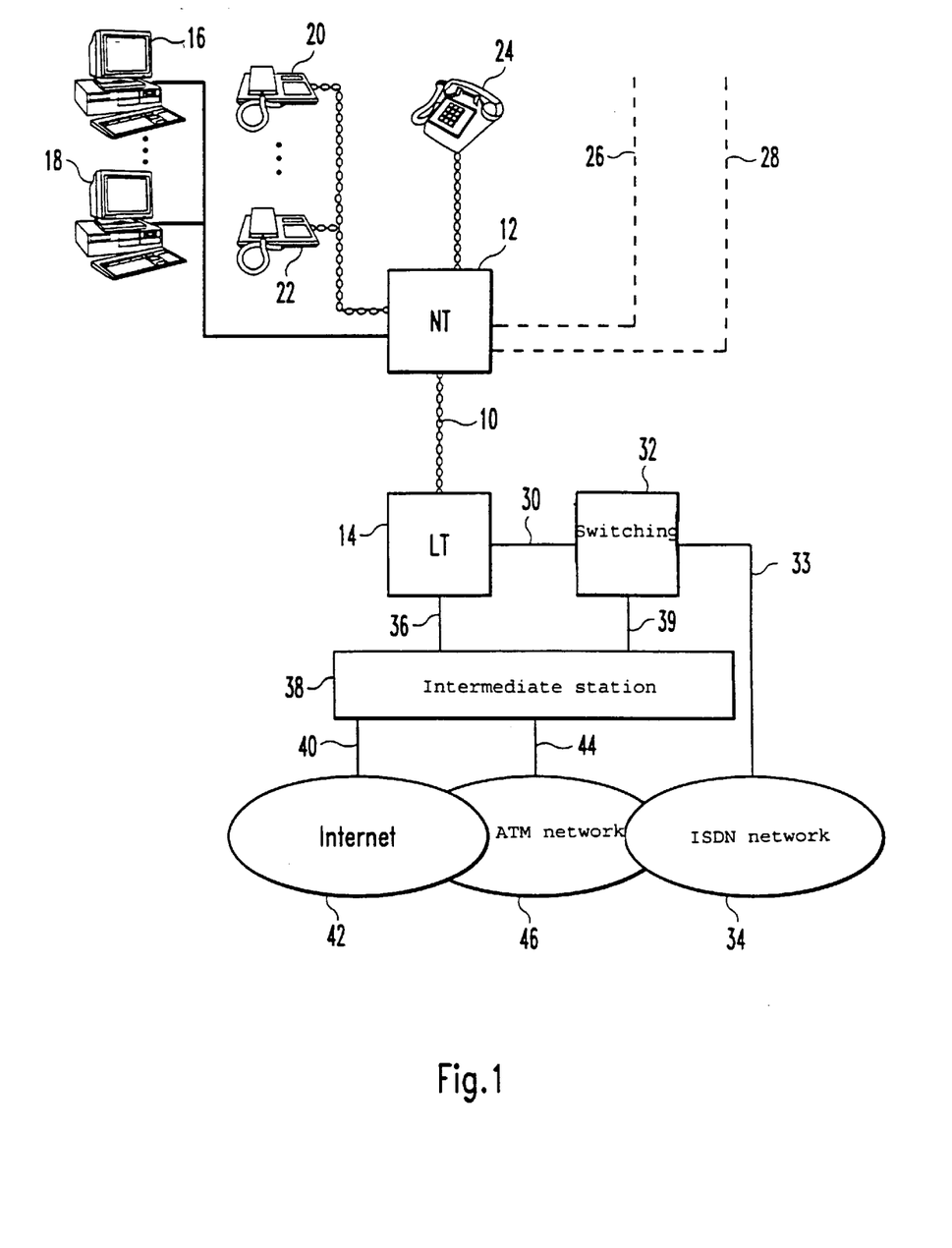
FIG. 1 is a block diagram showing the connection of a subscriber to a data line, with transmission using the enhanced ISDN method.

FIG. 1 shows the connection of a subscriber in a telecommunications system to a data line 10 on which data are transmitted using an enhanced ISDN method. The data line 10 connects a line termination unit 14 on the switching side to a network termination unit 12 on the subscriber side, via a distance of, for example, 2 km.

Data processing terminals 16 to 18, digital telephones 20 to 22 as well as an analog telephone 24 are connected as terminals to the network termination unit 12. Other terminals (which are not illustrated) or subscriber extensions are connected to lines 26 and 28.

The line termination unit 14 is used to separate the data transmitted via the data line 10 from the subscriber into data for both connection-oriented and non-connection oriented transmissions. The data for connection-oriented transmission are transmitted via a line 30 to a local switching center 32, which sets up the respective connection in a switching matrix. The data which are transmitted in a connection-oriented manner pass via a line 33 into the ISDN network 34.

Data which are transmitted in a non-connection-oriented manner are transmitted from the line termination unit 14 on a line 36 to an intermediate station 38. Data which are non-connection-oriented include, for example data to and from the Internet, which are produced and received, respectively, by the data processing terminals 16, 18. The intermediate station 38 passes data which are non-connection-oriented via a line 40 to the Internet 42, or via a line 44 to an ATM network 46.

The intermediate station 38 can also carry out format conversion for connection-oriented data which has been transmitted as ISDN signals to the switching center 32. For this purpose, the output side of the switching center 32 is connected via a line 39 to the intermediate station 38. One example of such data may comprise ATM signals (Asynchronous Transfer Mode). These are passed to the ATM network, or come from this network, via the line 44. In the same way, data which are non-connection-oriented can be transmitted as ISDN signals by the switching center 32, and are sent via the intermediate station 38 into the connected data network and from the connected data network.

On the other hand, data are also transmitted from the line termination unit 14 to the network termination unit 12, once again using the enhanced ISDN Standard explained with reference to FIG. 3.

Figure 2:
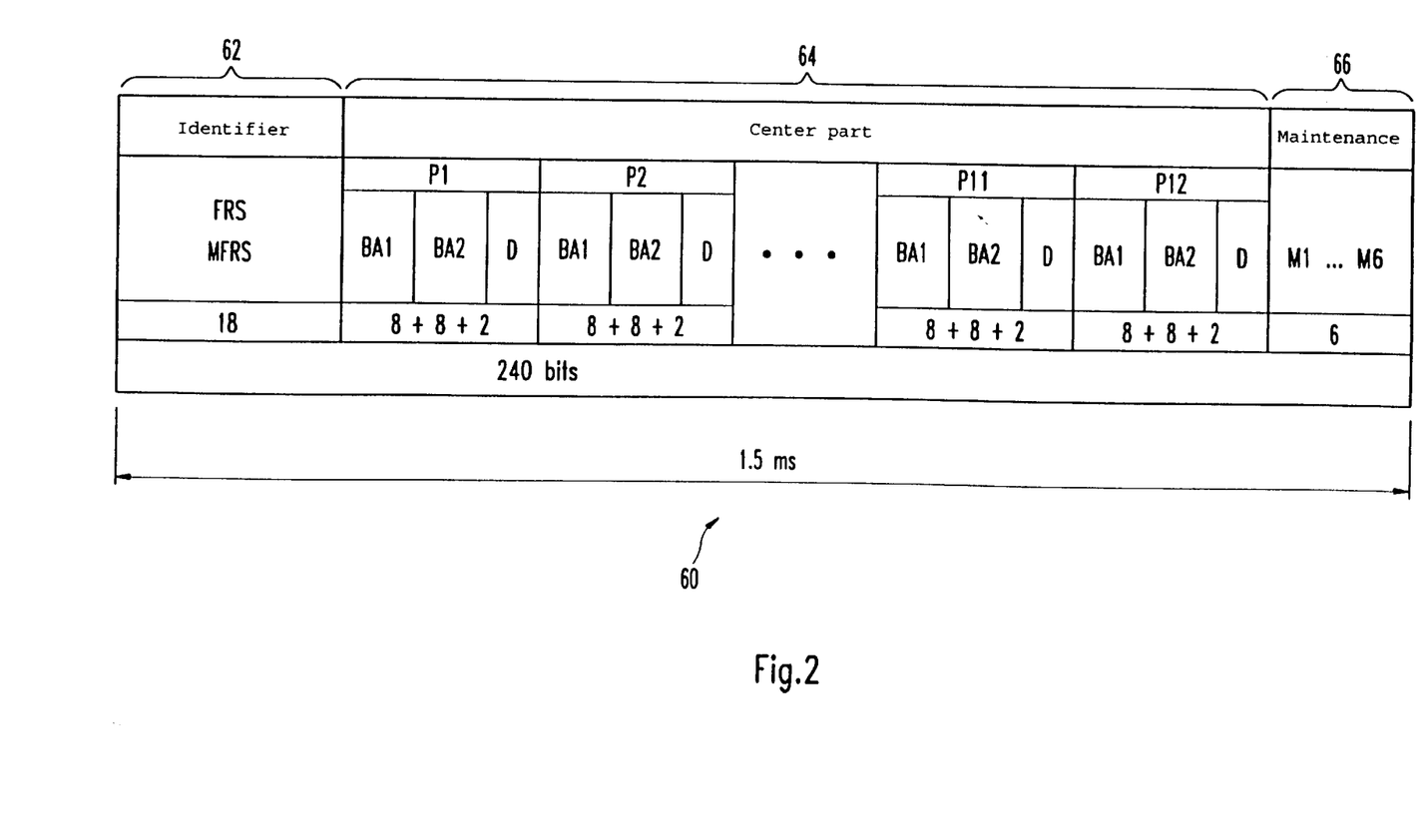
FIG. 2 is a diagram illustrating a standard ISDN time frame for the 2B1Q transmission option.

FIG. 2 shows a standard ISDN time frame, as is defined, for example, in Technical Report ETR 080 by the European Telecommunications Standardization Institute for the option with 2B1Q transmission. The time frame 60 contains 240 bits which are transmitted within 1.5 ms. Transmission in this case relates, for example, to the transmission process or the reception process. 18 bits at the start of the time frame 60 identify the start of the time frame 60 and are used for synchronization. These bits are called the time frame identifier 62.

The data from two useful channels BA1 and BA2 as well as a data channel D are in each case transmitted alternately in a center part 64 of the time frame 60. The time slots for transmitting the data in the useful channel BA1, BA2 and in the data channel D are thus interleaved. The useful data are transmitted in the useful channels BA1 and BA2 as data words which each have eight bits. The data in the data channel are transmitted with a length of two bits each. Two successive data words and the two bits of the data channel in each case form a group P1 to P12, each of which contains eighteen bits. Six bits M1 to M6 are transmitted at the end of the time frame 60, and are used for maintenance and transmission purposes. The part at the end of the time frame 60 is also called the maintenance part 66. The time axis in FIG. 2 is represented by an arrow 68, which indicates that times which occur later are located further to the right than earlier times.

Figure 3:
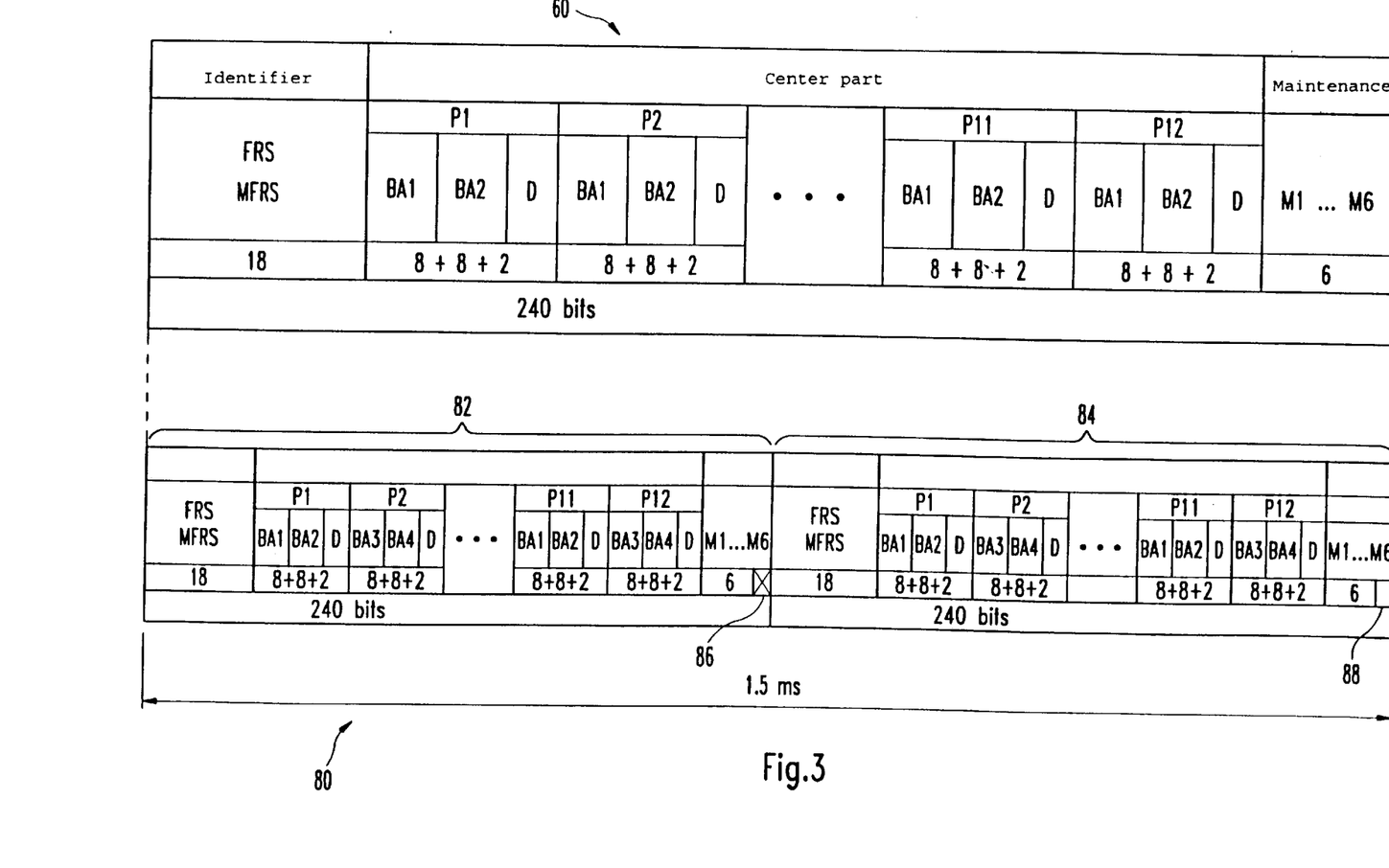
FIG. 3 is a block diagram showing a comparison of an ISDN time frame as shown in FIG. 2 with an overall frame for the enhanced ISDN method.

The upper part of FIG. 3 shows the time frame 60, for comparison with an overall frame 80 according to a first embodiment of the invention. The overall frame 80 is likewise transmitted in 1.5 ms. However, the overall frame 8b contains two time frames 82, 84, which each contain 240 bits. The data transmission capacity of the useful channels BA1 to BA4 is four times 64 kbit/s.

In the illustrated example, each time frame 82, 84 contains the same integer number of time slots for the useful channels BA1 to BA4. But this is no longer the case, as a rule, if—therefor; a greater number of time frames are transmitted per overall frame 80. The assignment of the time slots to the individual useful channels within the different time frames in an overall frame 80 is likewise different. An overall frame identifier is used for the overall frame, in order to make it possible, at the receiving end, to assign the individual time slots in the various time frames to the correct channels.

This overall frame identification can be carried out in various ways. For example, the time frame identifier 62 (time frame identification word FRS/MFRS) can be shortened by two bits in each time frame. One or both of these bits are set to a predetermined value in the first time frame (for example in the time frame 82) in an overall frame 80, and this value differs from the value at the same point in the other time frames in the same overall frame 80.

If the time frame identifier 62 for the time frames is intended to remain unchanged in comparison with the ISDN Standard, then a maintenance frame identifier which is defined in the ISDN Standard can be used. According to the ISDN Standard (option for 2B1Q transmission), the time frame identifier FRS is inverted in every eighth time frame into a maintenance frame identification word (MFRS). According to the ISDN Standard, the bits numbered "239" and "240" have no function in the time frame with the maintenance frame identification word MFRS. One or both of these bits can thus be set to a predetermined value, which differs from the value at the same point in the rest of the time frames in the respective overall frame.

The maintenance frame identifier and the overall frame identifier are time-synchronized at least once in such a manner that the start of an overall frame 80 coincides with the start of a maintenance frame. Since the maintenance frame contains eight time frames and the overall frame 80 contains n time frames, the start of the two frames generally coincides in time only at relatively long intervals. In this case, n is a natural number greater than zero.

In FIG. 3, the bit with the number "240" is represented as the identification bit 86 for the overall frame 80. The bit "240" in the time frame 84 has no identification function with respect to the overall frame 80 (cf. reference symbol 88). The identification bit 86 coincides, as mentioned, after a number of time frames with the bit "240" in the first time frame of a maintenance frame. This number is governed by the least common multiple of the number of time frames in the maintenance frame, namely eight, and the number of time frames n in an overall frame 80. If there are two time frames per overall frame, the relevant bits correspond after every eight time frames. If there are three time frames per overall frame, this occurs after 24 time frames, and so on. The identification bit 86 has a value which differs from that of the ISDN Standard only when it coincides with the bit 240 in the maintenance frame.

Since the position of coincidence can easily be determined simply by counting down, it is sufficient for unique identification of the overall frame start to carry out cyclic monitoring of the bits at the designated position "239" and/or "240" in every eighth time frame, which contains the inverted maintenance frame identification MFRS. The starting points of the intermediate overall frames 80 are likewise determined simply by counting down the bits, since the length of the overall frame 80 is given uniquely in bits, owing to the number of time frames contained, which each have 240 bits.

The fact that each overall frame 80 does not contain an overall frame identification is not a disadvantage, since all that is needed for synchronization is to check the synchronization from time to time, in order to identify, for example, a discrepancy resulting from a power failure and to initiate a new synchronization process.

If only terminals which have a data transmission capacity of 64 kbit/s are used, then four useful channels BA1 to BA4 can be used in the example shown in FIG. 3. In this case, it is expedient to interleave the useful channels BA1 to BA4 in a similar manner to that for the useful channels BA1 and BA2 in the time frame 60. When the useful channels BA1 to BA4 are interleaved, and thus the data channels D as well, only a small amount of the data in each useful channel BA1 to BA4 is affected when a transmission error occurs. Error correction is thus simplified.

Data may be transmitted in the useful channels BA1 to BA4 both in a connection-oriented and non-connection-oriented manner. A connection-oriented transmission can thus be carried out in the useful channel BA1, and a data transmission which is non-connection-oriented in the useful channel BA2. The data for a transmission which is non-connection-oriented are normally transmitted as data packets. The data packets are distributed between the time slots in the useful channel BA1 in the transmitter for the overall frame 80. The data packets are then reassembled from the data in the useful channel BA2, in the receiver of the overall frame 80.

Depending on the size of the data packet, the starting point of a data packet may coincide with the first data in the useful channel BA2 in a time frame 82, 84, in an overall frame 80, or else only in every fourth overall frame 80. The end of a data packet can be found in the receiver, since the size of the data packet to be transmitted is known there. This size can be standardized, or else can be transmitted to the receiver in the initial data in a data packet. However, a data packet may also start any point. For example, a preamble, i.e., a known bit sequence preceding the actual data packet, is used for identification.

Figure 4:
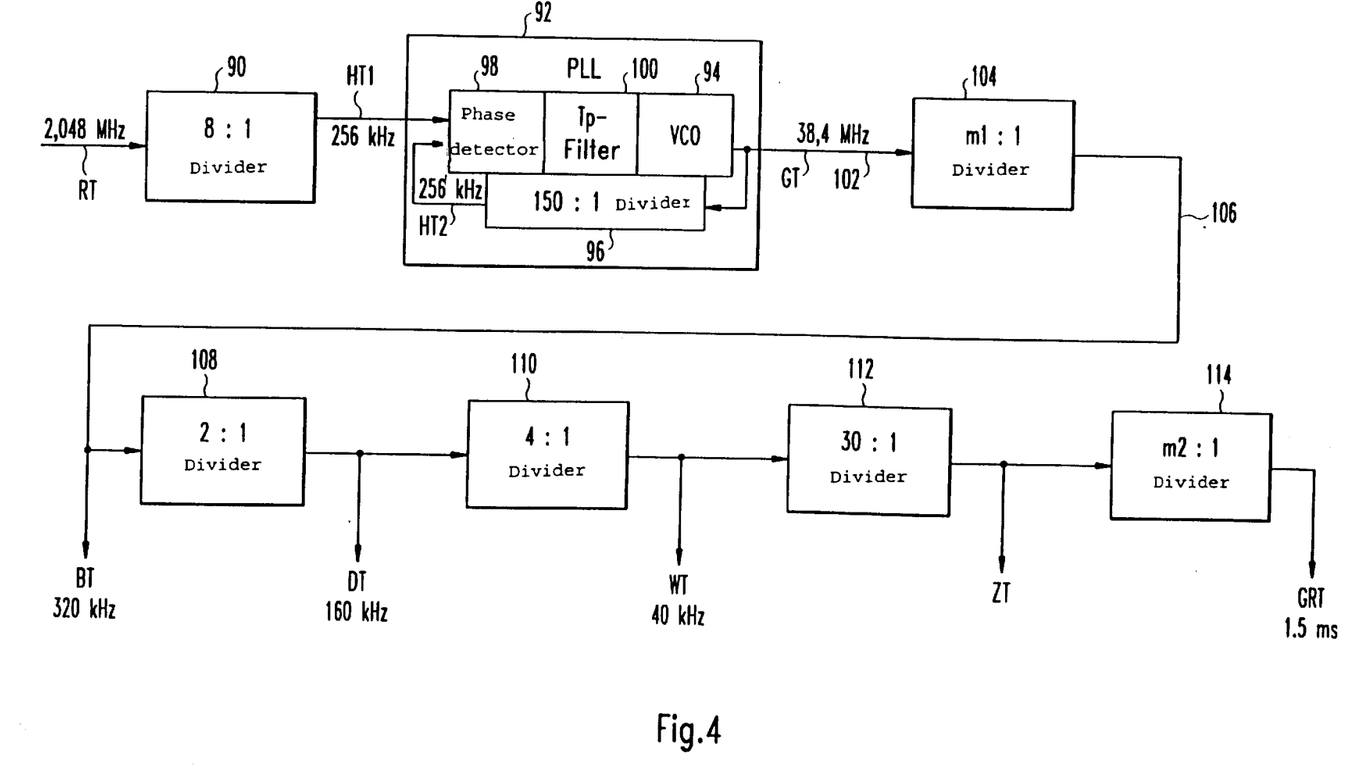
FIG. 4 is a block diagram showing the major electronic units for producing different clock signals in a line termination unit.

FIG. 4 shows the major electronic units for producing different clock signals in the line termination unit 14 (see FIG. 1). A very stable reference clock RT at 2.048 MHz is available in the line termination unit 14. A clock which is derived from the reference clock RT is used as a set point for tracking synchronization (Phase Locked Loop PLL). The aim is a stable basic clock GT at 38.4 MHz.

Before the reference clock RT is used to control the PLL, it is divided by the ratio 8:1 in a divider/counter 90. This results in the production of an auxiliary clock HT1 at 256 kHz, which is applied to the input of a phase control unit 92. The phase control unit 92 contains a voltage-controlled oscillator 94, which oscillates at 38.4 MHz, thus resulting in the basic clock GT. A divider/counter 96 is used to divide the basic clock GT by the ratio 150:1, so that an auxiliary clock HT2 is produced, at a frequency of 256 kHz.

The two auxiliary clocks HT1 and HT2 are each at 256 kHz and are supplied as input parameters to a phase detector 98. The phase detector 98 uses the discrepancy between the phases of the auxiliary clock HT1 and the auxiliary clock HT2 to calculate a control parameter for the voltage-controlled oscillator 94. A low-pass filter 100 is also arranged between the output of the phase detector 98 and the input for controlling the voltage-controlled oscillator 94, in order to improve the accuracy of the control process.

A very stable basic clock GT is thus available on a line 102 at the output of the phase control unit 92. The line 102 is connected to the input of a divider/counter 104, whose division ratio is governed by a predetermined division value m1. If there are two time frames per overall frame, the division value m1 has the numerical value "120", so that a bit clock at 320 kHz is produced on an output line 106 from the divider/counter 104. This clock governs the processing time for one bit in the overall frame 80 (see FIG. 3).

Division of the bit clock BT in a divider/counter 108 by the ratio 2:1 results in a double bit clock DT at 160 kHz. Since two bits are in each case combined to form a quad for transmission using the ETR 080 ISDN Standard used in the exemplary embodiment, the double bit clock DT is particularly important. Specifically, the double bit clock DT is precisely the clock rate by which the signal values on the data line 10 can vary (see FIG. 1). Four signal values are permissible. Two bits in the overall frame 80 are determined from the respectively received signal value.

The double bit clock DT is then divided in the ratio 4:1 in a counter/divider 110. This results in a word clock WT at 40 kHz. The word clock WT is used for processing eight bits in each case, that is to say a data word, in the overall frame 80 (see FIG. 3).

The word clock WT is divided in the ratio 30:1 in a further divider/counter 112. This results in the production of a time frame clock ZT, which is used for processing the time frames.

The frequency of the time frame clock ZT is divided by a division value m2 in a final divider/counter 114. If there are two time frames per overall frame 80 (see FIG. 3), the division value m2 has the numerical value "2". The overall frame clock GRT with a period duration of 1.5 ms is produced at the output of the counter/divider 114. The overall frame clock GRT is used for synchronization of the overall frames.

Figure 5:
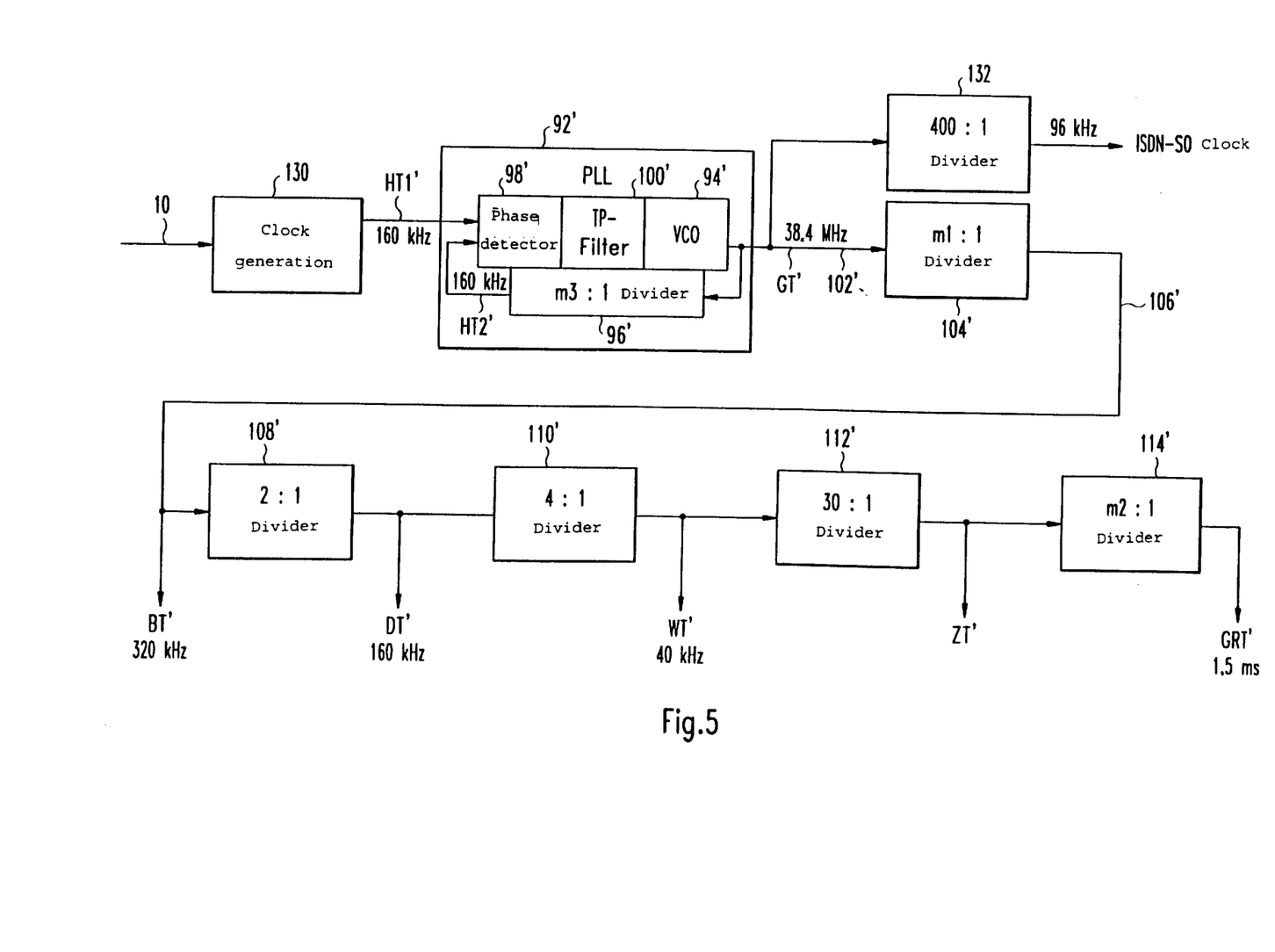
FIG. 5 is a block diagram showing the essential electronic units for producing different clock signals in a network termination unit.

FIG. 5 shows the major electronic units for producing different clock signals in the network termination unit 12 (see FIG. 1). The reference clock RT is not available in the network termination unit 12. This results in a clock being produced in a somewhat different way from that in FIG. 4. Units which have already been explained in FIG. 4 are provided with the same reference symbols in FIG. 5, but with a superscript prime.

An auxiliary clock HT1' is produced in a clock generating unit 130 from the signal values on the data line 10, and its frequency is 160 kHz if there are two time frames per overall frame. As mentioned above, this frequency matches the frequency produced by the signal change on the data line 10. An auxiliary clock HT2' is produced in the divider/counter 96' from a basic clock GT' at 38.4 MHz which is also produced in the phase control unit 92'. In this case, the frequency of the basic clock GT' is divided by a division value m3. If there are two time frames per overall frame 80, the division value m3 has the numerical value "240", resulting in a frequency of 160 kHz for the auxiliary clock HT2'. The basic clock GT' is then produced in the phase control unit 92' as explained above with reference to the phase control unit 92 (see FIG. 4).

A bit clock BT', a double bit clock DT', a word clock WT' (eight bits), a time frame clock ZT' as well as an overall frame clock GRT' are produced from the basic clock GT' in the network termination unit 12 (see FIG. 1), with the aid of a division chain comprising the dividers/counters 104' to 114'. The frequencies of these clock signals match the frequencies of the corresponding clock signals BT, DT, WT, ZT and GRT.

The frequency of the basic clock GT' is divided by the value "400" by a divider/counter 132. This thus results in a clock signal at a frequency of 96 kHz being produced at the output of the divider/counter 132. This is the clock for the ISDN-S0 interface.

Figure 6:
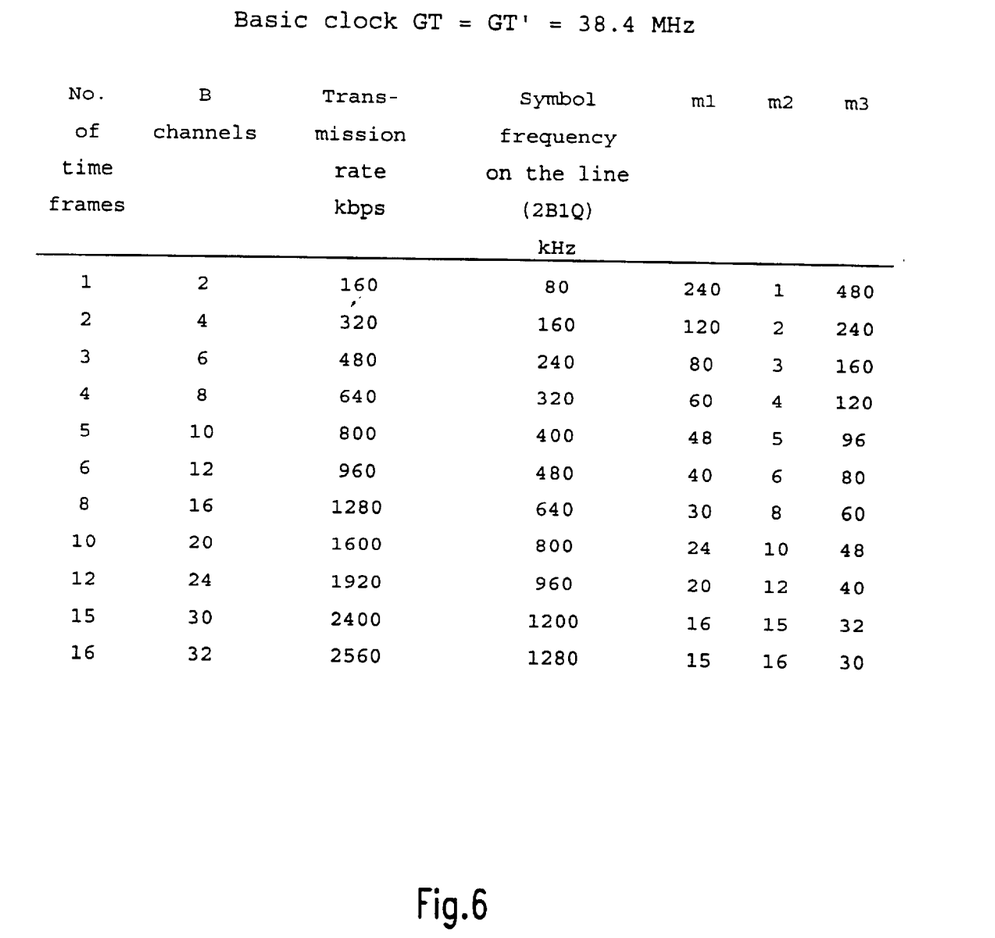
FIG. 6 is a table showing of the division ratios for clock production when using an overall frame.

FIG. 6 shows a table whose columns, from left to right, are explained below. The first column shows the number of time frames in an overall frame 80 (see FIG. 3). The second column indicates the number of channels with a transmission capacity of 64 kbit/s (B channels) in the overall frame. The subsequent line in the table shows the transmission rate on the line, in kbit/s. The symbol frequency (in kHz) for the transmission is shown alongside this. The respective division values m1, m2 and m3 are entered in the fifth, sixth and seventh columns respectively.

The first line in the table shows numerical values for an overall frame 80 having only one time frame. In this case, a time frame has the time duration specified by the ISDN Standard of 1.5 ms. According to the ISDN Standard, there are two useful channels, each at 64 kbit/s. The transmission rate is 160 kbit/s, and the symbol frequency on the line for 2B1Q coding is 80 kHz. The division values m1, m2 and m3 have the values "240", "1" and "480", respectively.

The second line in the table in FIG. 6 shows the numerical values for the exemplary embodiment explained above with reference to FIGS. 3 to 5, having two time frames per overall frame. The data transmission capacity in this case is 320 kbit/s, and four useful channels are available, each at 64 kbit/s. A plurality of useful channels can also be combined to form one useful channel so that, for example, this results in only one useful channel, with a data transmission rate of 256 kbit/s.

The penultimate line contains the values for fifteen time frames per overall frame. In this case, thirty useful channels, each at 64 kbit/s)are available. The total data transmission capacity of the useful channels, is 2.4 Mbit/s. A combination of these channels to form one channel allows, for example, high-quality video transmissions, if data compression methods are used. A data transmission capacity of about two Mbit/s is rarely exceeded in small offices or groups of offices, or for domestic purposes and is illustrated by, the last line in the table in FIG. 6 which shows the case where there are sixteen time frames in one overall frame.

By varying the division values m1, m2, m3 as shown in the table in FIG. 6, clocks can be produced for transmitting overall frames with up to sixteen time frames in the steps indicated in column 1. This results in a standard concept in order to achieve a data transmission capacity of about 2 Mbit/s in steps from the current ISDN Standard by multiplying the number of time frames per overall frame. This procedure is based on the existing two-wire lines, and reaches the limit of the data rate which can be achieved over a sufficiently long distance on such lines.

The standard concept furthermore allows the data transmission capacity to be matched to the quality of the data line 10 (see FIG. 1). To this end, a calibration process is used to determine the maximum possible data transmission capacity for a predetermined maximum permissible error rate. Depending on this data transmission capacity, the number of time frames per basic frame is then determined, possibly by using the table in FIG. 6. The division values m1, m2 and m3 can also be read off.

Figure 7:
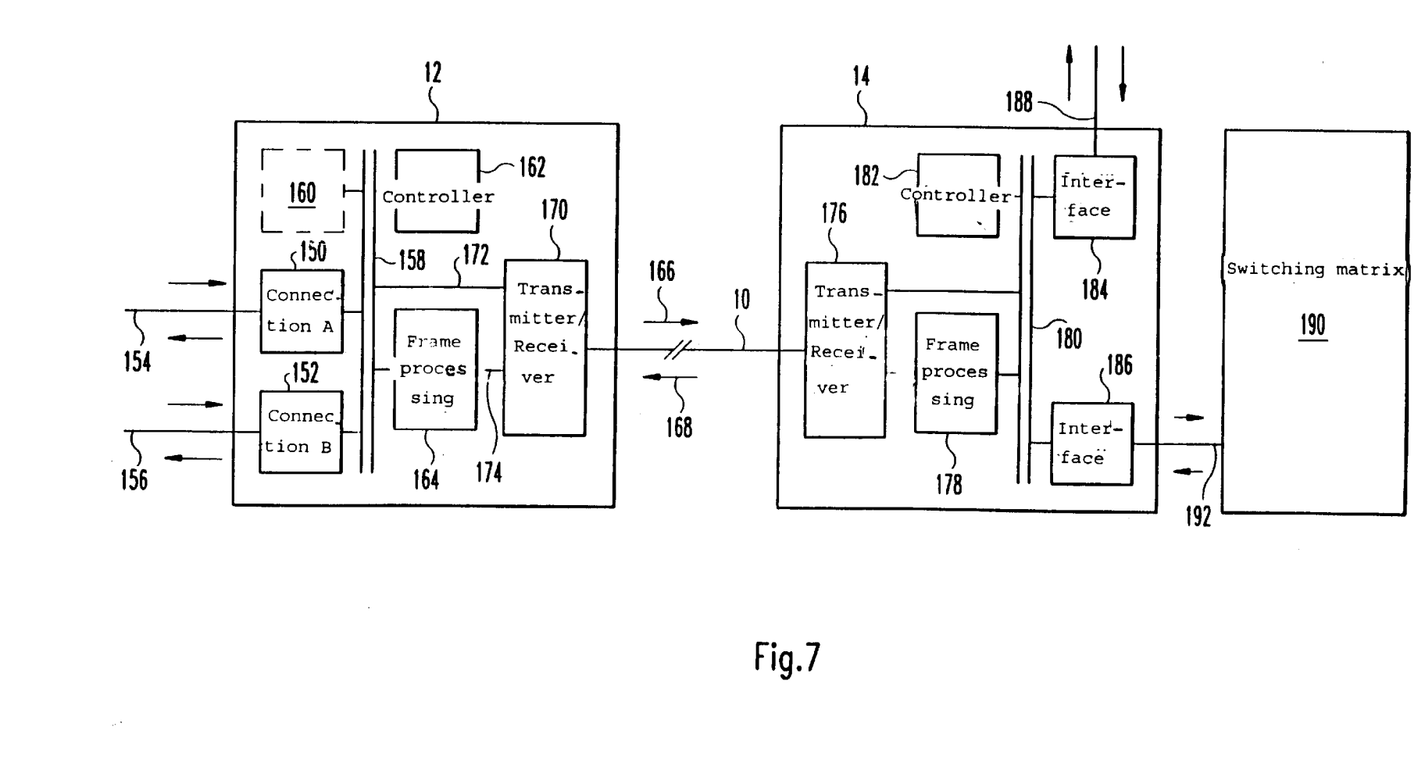
FIG. 7 is a block diagram showing the design of the network termination unit and of a subscriber adapter card.

FIG. 7 shows the design of the network termination unit 12 and of the line termination unit. 14. The network termination unit 12 contains two access units 150 and 152, each of which has one terminal connected via lines 154 and 156, respectively. Data are transmitted on the lines 154, 156 bidirectionally, as indicated by arrows. The access units 150 and 152 are also connected to a line bus 158. Other access units 160 for terminals are connected to the bus 158. In addition, a control unit 162 is connected to the bus 158, and controls all the communication between the units 150, 152, 160, 164, 170 which the network termination unit 12 contains.

The network termination unit 12 also contains a frame forming/disassembly unit 164, in which the overall frames 80 (see FIG. 3) are produced when data items are transmitted from the network termination unit 12 to the line termination unit 14, and which split the data in the overall frames 80 between the access units 150, 152 and 160 when data are transmitted in the opposite direction (see the arrows 166 and 168). A transmitting/receiving module 170 then sends the overall frame via the data line 10 to the line termination unit 14 in the form of a four-step signal (2B1Q) and receives the overall frames coming from the line termination unit 14. The transmitting/receiving module 170 is connected not only to the bus 158, but also to the frame forming/disassembly unit 164, via lines 172 and 174, respectively.

The other end of the data line 10 is connected to a transmitting/receiving module 176 in the line termination unit 14. The transmitting/receiving module 176 receives the overall frames coming from the network termination unit 12 and sends overall frames from the line termination unit 14 to the network termination unit 12. The overall frames are produced in a frame forming/disassembly unit 178 in the line termination unit before they are sent, and are disassembled after being received. The frame forming/disassembly unit 158 is connected to a bus 180. A control unit 182 controls the communication between the units 176, 178, 184, 186 which the line termination unit 14 contains.

The line termination unit 14 also contains a first interface unit 184 for non-connection-oriented transmissions and a second interface unit 186 for connection-oriented transmissions. Both interface units 184, 186 are connected to the bus 180. The interface unit 184 is used for data non-connection-oriented transmissions for example connections to the Internet. These transmissions are characterized by the fact that the transmission path for the data is not defined before the transmission. The data can thus be transmitted on different connecting paths, for example) depending on the load level found on the various connecting paths. A bidirectional transmission line 188 is connected to the interface unit 184, and is part of a data network which allows transmissions which are not connection-oriented.

The interface unit 186 is used for connection-oriented transmission of data. The unit is connected to a switching matrix 190 in order to pass a connection via a line 192. For example, switched ISDN data are transmitted via the line 192 to the switching matrix 190, and from the switching matrix 190 to the interface unit 186.

What is claimed is:

1. A circuit arrangement for transmitting data, comprising:
   a receiving unit for receiving useful data which have been produced when using at least one transmission service for transmitting data,
   a frame producing unit for producing a time sequence of useful data, wherein a number of individual data containing frames configured in accordance with ISDN standards are produced,
   an output unit for transmitting the data, wherein said output unit transmits an overall frame formed from a plurality of the individual frames within a time that corresponds to the ISDN standard transmission time for transmitting a single ISDN frame;
   a frame identifier associated with at least one overall frame in a sequence of transmitted overall frames, the frame identifier indicating which portion of said plurality of individual time frames form each of said overall frames in said sequence.

2. A method for transmitting digital data using a time-division multiplex method, comprising the steps of:
   transmitting data bits within a sequence of individual time frames, wherein the number of data bits being transferred in each time frame corresponds to the ISDN Standard for the number of bits forming a time frame;
   transmitting overall frames, each comprising a plurality of said individual time frames within the time which is specified by the ISDN Standard for the transmission of an ISDN time frame; and
   using a frame identifier, which is contained within at least one overall frame in a sequence of transmitted overall frames, the frame identifier indicating which portion of said plurality of individual time frames form each of said overall frames in said sequence.

3. The method as claimed in claim 2, further comprising the step of
   determining a number of said time frames per said overall frame in a calibration process, as a function of a transmission quality of a transmission path for transmitting signal values from a transmitter to a receiver.

4. The method as claimed in claim 3, further comprising the step of:
   repeating said calibration process if a predetermined error rate for said transmission of data bits is exceeded.

5. The method as claimed in claim 2, further comprising the step of:
   using a communication standard which is the ISDN Standard specified in Technical Report ETR 80 by the European Telecommunications Standardization Institute (ETSI), in which case the option for 2B1Q transmission defined in the Standard is used.

6. The method as claimed in claim 5, further comprising the step of:
   using the option for 2B1Q transmission specified in said ISDN Standard.

7. The method as claimed in claim 2, further comprising the step of:

providing a predetermined value as said frame identifier to a predetermined position in said overall frame, wherein said predetermined value differs from a value which may be specified for said predetermined position by the ISDN Standard.

8. The method as claimed in claim 7, further comprising the step of:

determining said frame identifier in conjunction with the determination of said time frame identifiers (specified by the ISDN Standard) in said time frames.

9. The method as claimed in claim 2, further comprising the step of:

transmitting data for a connection-oriented transmission in at least one channel.

10. The method as claimed in claim 9, further comprising the step of:

transmitting data for a non-connection-oriented transmission in at least one channel.

11. The method as claimed in claim 2, further comprising the step of:

transmitting data for a non-connection-oriented transmission in at least one channel.

12. The method as claimed in claim 11, further comprising the step of:

signaling the start of a transmission of data which are associated with a data packet in said non-connection-oriented channel of transmission, said signaling occurring within at least one data item at a further specified position in said overall frame.

13. The method as claimed in claim 2, further comprising the steps of:

producing a synchronization clock from a specified basic clock for synchronization of said overall frame, using at least one divider module whose division ration can be matched to a determined number of said time frames per said overall frame.

14. The method as claimed in claim 13, wherein said basic dock operates at a frequency of 38.4 MHz when using an option for 2B1Q transmission defined in the ISDN Standard.

* * * * *